CALL TRANSMITTER

Filed June 1, 1967 3 Sheets-Sheet 1

INVENTOR
J. D. ASKEW
BY
[signature]
ATTORNEY

United States Patent Office 3,514,549

Patented May 26, 1970

3,514,549

CALL TRANSMITTER

John D. Askew, Atlanta, Ga., assignor to American Telephone and Telegraph Company, New York, N.Y., a corporation of New York Filed June 1, 1967, Ser. No. 642,866
Int. Cl. H04m *1/51*
U.S. Cl. 179—90 2 Claims

ABSTRACT OF THE DISCLOSURE

The call transmitter operates in conjunction with a data record having information recorded on a magnetic strip extending along one side thereof. The data record when properly inserted in a slot in the call transmitter closes a pair of switches that enable the operation of the call transmitter and when such operation commences, a pair of solenoids are energized that clamp the data record in place. Information is recorded on a magnetic strip by applying current reversals to selected combinations of four record and reproduce heads, and when the magnetic strip is read these magnetization reversals energize selected combinations of four relays to tune two resonant circuits. The resonant circuits are inductively coupled to an oscillator that transmits signals at the frequencies to which the resonant circuits are tuned.

FIELD OF THE INVENTION

This invention relates to the field of information transmission and within that field to apparatus for transmitting signals that serve to establish a connection between two or more terminals of a communication system and/or for transmitting signals between such terminals once a connection therebetween has been established. Apparatus of the former type is generally referred to in the telephone art as a call transmitter and apparatus of the latter type is generally referred to as a data transmitter. While the invention will be referred to as a call transmitter, it is to be understood that the invention can be used as either a call transmitter or a data transmitter or both. In addition, while the invention will be described in terms of telephone communications, it is not so limited, but may find use in all areas of information transmission.

DESCRIPTION OF THE PRIOR ART

Certain types of businesses, such as small loan companies, for example, have employees whose chief duty it is to make telephone calls. In such a business, the employee works with stacks of data records, each record having information with respect to an individual customer entered thereon. Day after day the employee goes through stacks of records, observing the condition of each customer's account and telephoning those customers who require attention.

It would be advantageous for such an employee to be able to use an automatic call transmitter to call each customer he needs to speak to. However, where the information on each record includes the customer's telephone number, and therefore no time need be spent in finding the telephone number, the automatic call transmitters of the prior art do not offer any time saving over the manual dialing of the number.

To use an automatic call transmitter that has telephone numbers stored internally, it is necessary to scan an alphabetic or numeric directory for the desired name and position this name in a particular position with respect to a selector. Likewise, to use an automatic call transmitter that has the telephone numbers stored on individual cards external to the call transmitter, it is necessary to search through the cards to find the one having the desired telephone number encoded thereon and then insert this card into the call transmitter. Either of these procedures requires as much, if not more, time and effort than the manual dialing of the telephone number with a pushbutton dial.

SUMMARY OF THE INVENTION

The call transmitter of the present invention permits the customer's telephone number to be encoded right on the same data record on which account and/or other information with respect to the customer is entered. The telephone number is encoded along one side of the record and this side of the record is inserted into a slot in the call transmitter, the slot extending on two sides of the call transmitter. The call transmitter includes means for detecting the proper locating of the data record within the slot, and when the data record is so located, the detecting means permits the operation of means for scanning the encoding on the data record and transmitting signals corresponding to the encoded information.

DETAILED DESCRIPTION OF AN EMBODIMENT

Figure 1:
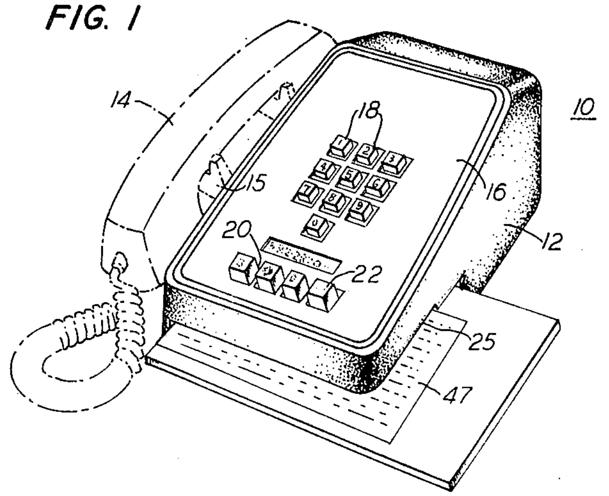
FIG. 1 is a perspective view of a telephone set embodying the call transmitter of the present invention, a data record with which the call transmitter operates being shown inserted into a slot into the telephone set.

Referring to FIG. 1 of the drawing, the call transmitter of the present invention is included in a telephone set 10 comprising a housing 12 and a handset 14, the handset when not in use being supported by a cradle 15 extending from the side of the housing. The cradle 15 operates the hook switch mechanism of the telephone set 10, the cradle being deflected downward when the handset 14 is placed thereon and moving upward when the handset is removed therefrom.

The housing 12 includes an inclined face 16 through which an array of pushbuttons 18, a record key 20, and a call key 22 protrude. The pushbuttons 18 are part of a pushbutton dial such as disclosed in Pat. 3,316,357, issued to J. H. Ham, J. F. Ritchey, and W. R. Tolman on Apr. 25, 1967, and are used in the manual operation of the call transmitter. As seen by the indicia appearing on the pushbuttons 18, they collectively represent the digits 1 through 0, and each pushbutton when depressed operates a multifrequency signal generator 24, hereinafter described with respect to FIG. 5, to produce a unique pair of frequencies corresponding to the digit appearing thereon. The record key 20 and call key 22 are employed in the automatic operation of the call transmitter.

Figure 2:
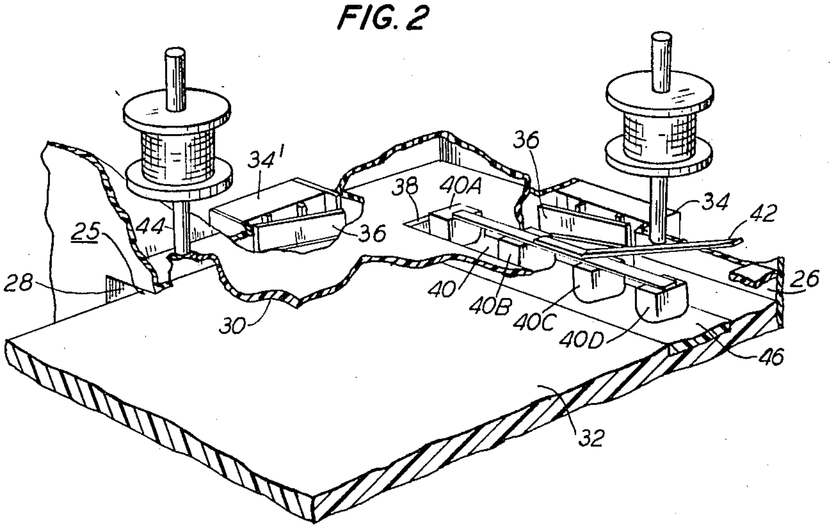
FIG. 2 is a perspective view with parts broken away for clarity of the elements of the call transmitter that interact with the data record.

The housing 12 further includes a continuous slot 25 that extends on two sides thereof, and as shown in FIG. 2, the slot is defined by a rear wall 26, a side wall 28, an upper surface 30, and a lower surface 32. The rear wall 26 has a recess therein, and mounted in the recess is a normally open locating switch 34 having an actuator 36. One end of the actuator 36 is secured to one side of the recess flush with the rear wall 26, while the other end of the actuator is biased away from the recess and extends out into the slot 25. When this biased end of the actuator 36 is deflected flush with the rear wall 26, the actuator closes the switch 34. An identical normally open locating switch 34' having an actuator 36' is mounted in a recess in the side wall 28.

The upper surface 30 of the slot 25 has a rectangular opening 38 therein that is spaced from both the rear wall 26 and the side wall 28, the length of the opening extending parallel to the rear wall. A multiple head 40, consisting of four equally spaced recording and reproducing heads 40A through 40D is positioned in the opening 38, and a carriage 42 supports the multiple head for movement along the length of the opening and biases the head against the lower surface 32. Each of the heads 40A through 40D is generally convex in shape so as to facilitate the deflection of the multiple head 40 upward by the insertion of a card between the heads and the lower surface 32.

The upper surface 30 also has a pair of openings in which a pair of pressure fingers 44 are respectively positioned. Each pressure finger is operated by a solenoid 45, and when the solenoids are unenergized, the lower ends of the pressure fingers are essentially flush with the upper surface 30. Energization of the solenoids 45 moves the pressure fingers against the lower surface 32 as shown in FIG. 3.

The lower surface 32 includes a pressure pad 46 that is a little longer and wider than and in registration with the opening 38 in the upper surface 30. In addition, the pressure pad 46 is generally flush with and has greater resiliency than the lower surface 32. The lower surface 32 extends forward from and to the side of the slot 25 to provide a platform.

Figure 3:
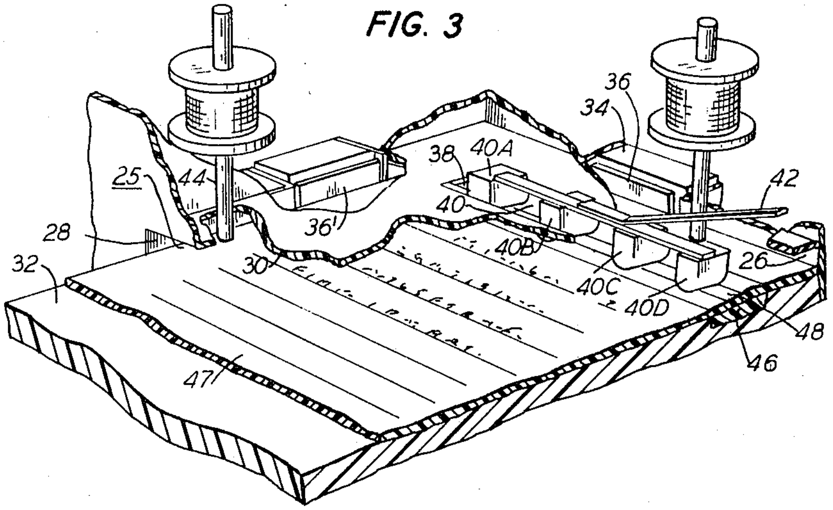
FIG. 3 is the same as FIG. 2 except that the data record is shown in its proper position and clamped in place.

Referring to FIG. 3, the call transmitter operates in conjunction with a data record 47 that is essentially a business form except that it is of a stiffness comparable to an ordinary postcard. In addition, the data record 47 is provided with a magnetic strip 48 that may be a length of magnetic tape adhered to the record or a magnetic surface deposited on the record. The magnetic strip 48 extends along the forward edge of the record 47, and the strip bears the same relation to the forward and side edges of the record that the rectangular opening 38 in the upper surface 30 bears to the rear and side walls 26 and 28. Thus, when the data record 47 is positioned in the slot 25 with the forward edge thereof contiguous with the rear wall 26, whereby the actuator 36 is deflected flush with the rear wall and the switch 34 is closed, and with the side edge thereof contiguous with the side wall 28, whereby the actuator 36' is deflected flush with the side wall and the switch 34' is closed, the magnetic strip 48 is in registration with both the multiple head 40 in the rectangular opening 38 and the pressure pad 46 in the lower surface 32.

The locating switches 34 and 34' must both the closed before the automatic operation of the call transmitter may be initiated. Each data record 47 is thereby assured of being located in the same relative position with respect to the record and reproduce heads 40A through 40D each time it is used. Furthermore, upon the initiation of the automatic operation of the call transmitter, the solenoids 45 are energized, moving the pressure fingers 44 against the data record 47 and clamping it in place. Thus the data record 47 is maintained in the proper position throughout the automatic operation of the call transmitter.

The automatic operation of the call transmitter is essentially the same as that described in Pat. 3,243,517, issued to R. A. Miller and C. M. Taris on Mar. 29, 1966 except that the recording is done on the magnetic strip 48 rather than on a magnetic drum. As described in this patent, the multiple head 40 always occupies an initial or index position when the call transmitter is not in operation, this being the position in which the multiple head s shown in FIGS. 2 and 3.

Figure 4:
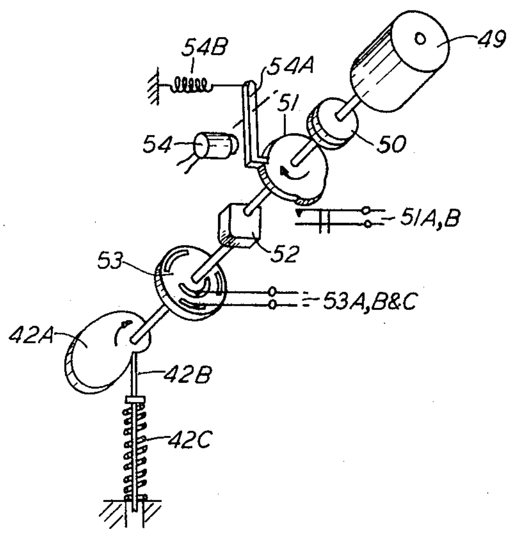
FIG. 4 is a mechanical schematic diagram of the drive mechanism.

During automatic operation, the carriage 42 and thereby the multiple head 40 is moved along the length of the magnetic strip 48 by a motive structure shown in FIG. 4 comprising a motor 49, a friction clutch 50, a stepping cam 51, a reduction gear 52, and a drive cam 42A. A follower 42B is secured to the carriage 42 and is maintained in contact with the rim of the drive cam 42A by a spring 42C, and hence as the cam rotates, the carriage is displaced according to the shape of the cam. The shape of the drive cam 42A is such that as it rotates, the carriage 42 is displaced relatively slowly to the right until scanning is completed and then the carriage is displaced relatively quickly back to the index position. The record and reproduce heads 40A through 40D are pressed against the magnetic strip 48, and the pressure pad 46 underlying the magnetic strip assures a good magnetic coupling between the heads and the strip.

Figure 6:
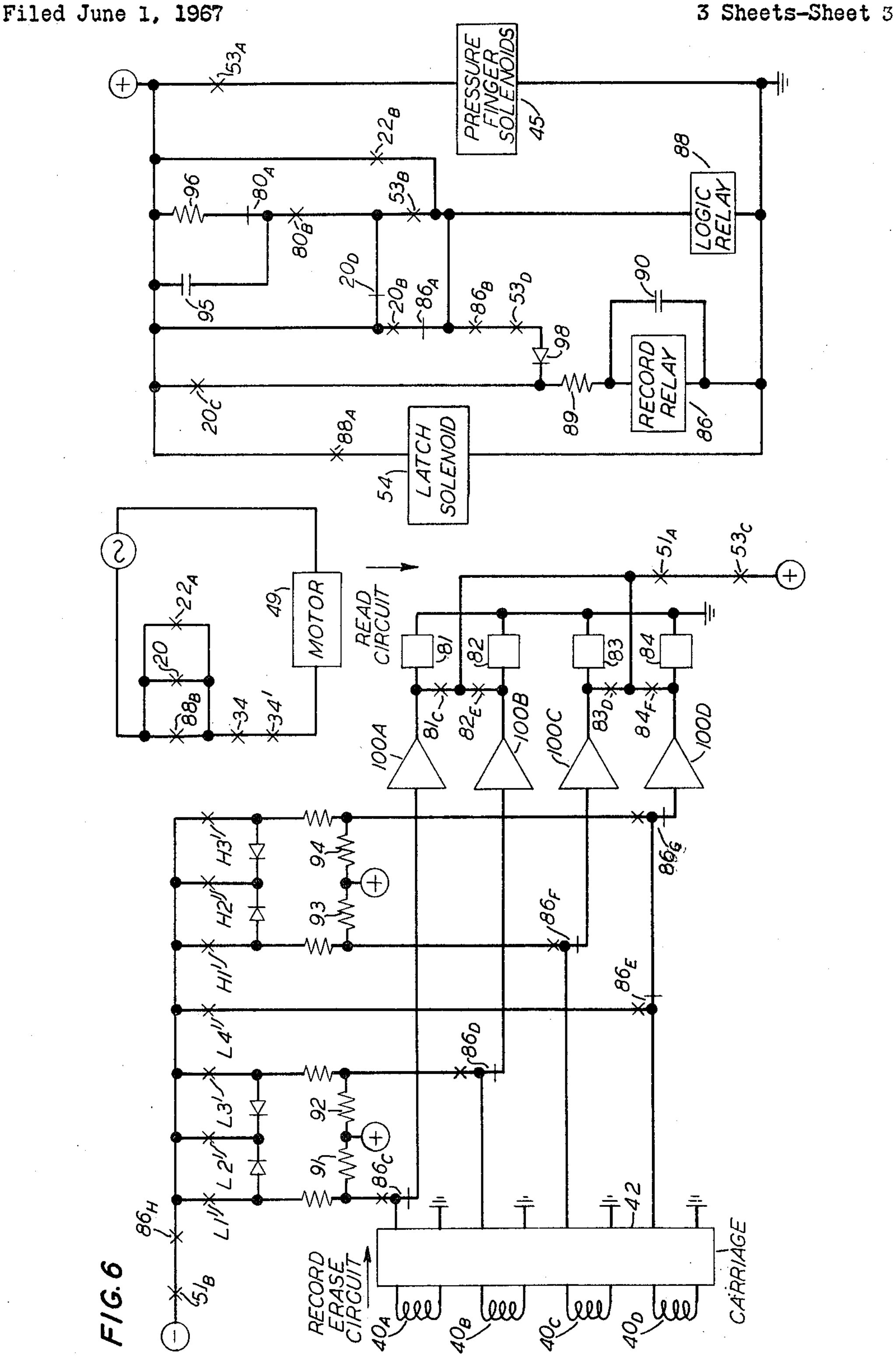

On the same shaft with the drive cam 42A is a printed circuit disc 53 that interacts with wiper contacts to provide four pairs of normally open contacts $53_A$ $53_B$ $53_C$ and $53_D$ shown in FIG. 6. These contacts all close when the printed circuit disc 53 is displaced from the index position, and contacts $53_A$ and $53_B$ do not open again until just before the printed circuit disc 53 returns to the index position. The contacts $53_C$ and $53_D$, however, reopen coincident with the completion of the scanning of the magnetic strip 48 and the commencement of the return of the multiple head 40 to the index position.

Rotation of both the drive cam 42A and the printed circuit disc 53 are controlled by a latch solenoid 54. The latch solenoid 54 is associated with a pawl 54A that is biased by a spring 54B into engagement with the stepping cam 51, and the pawl normally interacts with a tooth on the stepping cam to prevent its rotation. When the pawl 54A is so engaged, the rotation of the motor 49 is taken up by the friction clutch 50. Energization of the latch solenoid 54, however, disengages the pawl 54A from the stepping cam 51 and permits the drive cam 42A and the printed circuit disc 53 to rotate, the reduction gear 52 providing the drive cam and the printed circuit disc with a relatively small angular displacement for each revolution of the stepping cam. Furthermore, during the course of each revolution of the stepping cam 51, a lobe thereon closes two pairs of normally open contacts $51_A$ and $51_B$, shown in FIG. 6, for a portion of the revolution.

The circuitry and the operation of the call transmitter will now be described with reference to FIGS. 5 and 6. The circuitry is abbreviated to a large extent, all parts not essential to the understanding of the invention being omitted for the sake of clarity and brevity.

Figure 5:
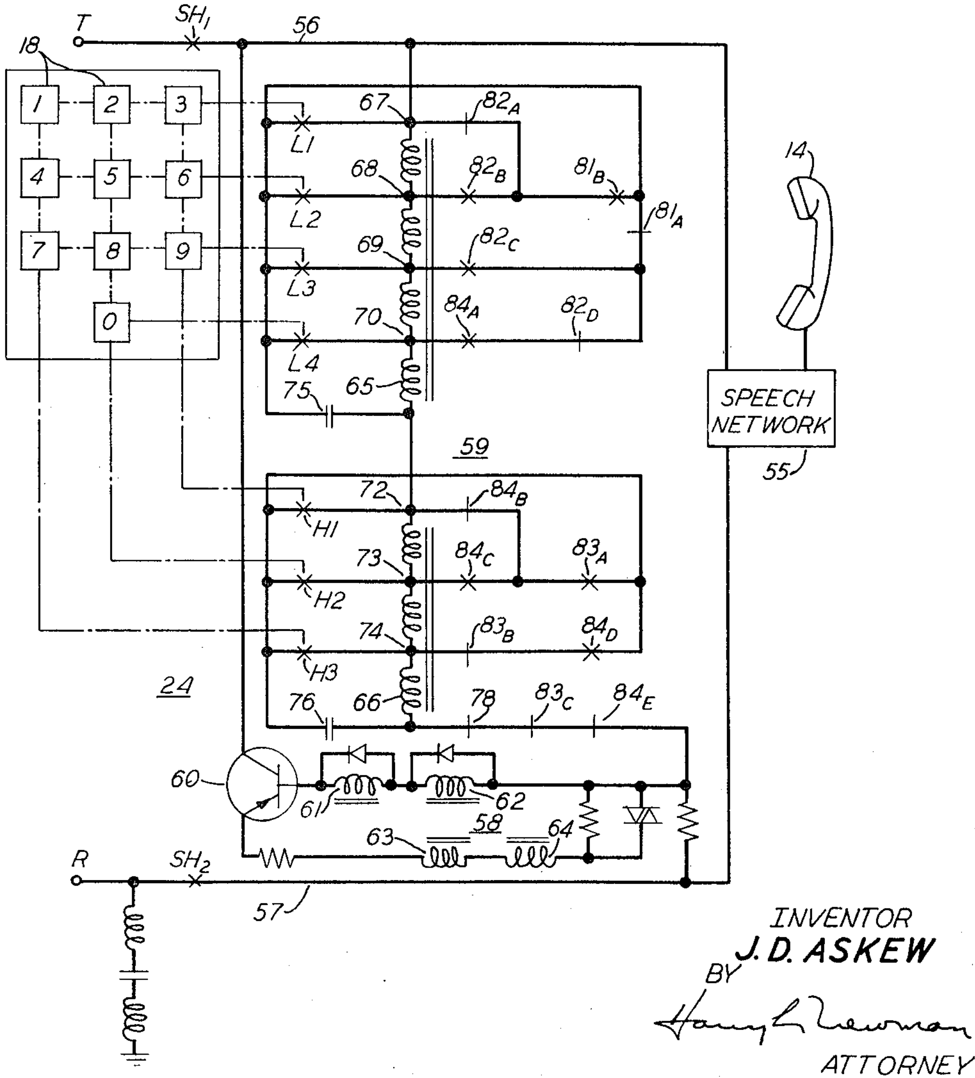
FIGS. 5 and 6 are schematic circuit diagrams.

Referring now to FIG. 5, the telephone set 10 includes a speech network 55 of which the transmitter and receiver in the handset 14 are a part, and the speech network is connected through line conductors 56 and 57 and the switch hook contacts SH1 and SH2 to the tip and ring conductors of a telephone line. Bridged across the line conductors 56 and 57 is the multifrequency signal generator 24 of the call transmitter. The signal generator 24 is essentially the same as that disclosed in reissue Pat. 25,507, issued to L. A. Meacham on Jan. 7, 1964, except that the interconnection between the signal generator and the speech network 55 is omitted. The signal generator 24 need not therefore be redescribed in detail herein. Suffice it to say that the signal generator 24 comprises a multifrequency oscillator 58 and a frequency determining circuit 59.

The multifrequency oscillator 58 includes a transistor 60, the base circuit of which has a pair of series windings 61 and 62 and the emitter circuit of which has a pair of series windings 63 and 64. The frequency determining circuit 59 includes a pair of windings 65 and 66, and the windings 61, 63, and 65 are wound on a common first core while the windings 62, 64, and 66 are wound on a common second core.

The windings 65 and 66, respectively, have taps 67 through 70 and taps 72 through 74 and the frequency of the oscillator 56 is varied by respectively connecting capacitors 75 and 76 across the entire length or selected portions of the windings 65 and 66 to form pairs of resonant circuits of differing frequencies. More specifically, the capacitors 75 and 76 have one side thereof respectively connected to one end of the windings 65 and 66, and the other side of the capacitors are connectable to the taps on the windings in one of two ways.

The first way is through the manual operation of the call transmiter by means of the pushbuttons 18. As indicated by the phantom lines extending between the pushbuttons 18 and two groups of normally open frequency selecting contacts $L_1$ through $L_4$ and $H_1$ through $H_3$, the actuation of any pushbutton results in the closure of one pair of L contacts and one pair of H contacts. Each pushbutton 18 located in a common row operates the same pair of L contacts and each pushbutton located in a common column operates the same pair of H contacts. Consequently, each pushbutton 18 operates a unique combination of L and H contacts.

Each pushbutton 18 also opens a pair of normally closed contacts 78 connected in series with the windings 65 and 66. The opening of the contact 78 interrupts the flow of direct current through the windings 65 and 66 and thereby shock excites the resonant circuits formed by the closed L and H contacts into oscillation. As hereinafter described, the pushbuttons 18 are also used in the recording of information on a data record 47, each pushbutton 18 when operated closing a unique pair of L′ and H′ contacts and transferring a switch 80 to open normally closed $\mathbf{80}_A$ and close normally open contacts $\mathbf{80}_B$ in the circuit of FIG. 6.

The second way in which the capacitors 75 and 76 are respectively connectable to the taps on the windings 65 and 66 is through the automatic operation of the cell transmitter. During the call cycle, two or more tap selecting relays 81 through 84, shown in FIG. 6, are energized for each digit encoded on the magnetic strip 48. The energized tap selecting relays 81 through 84 close and open particular contacts associated therewith to connect the taps corresponding to the encoded digit to the capacitors 75 and 76. In addition, the relays 83 and 84 also open normally closed contacts in series with the windings 65 and 66 to shock excite the resonant circuits so formed into oscillation.

Information is recorded on a data record 47 (FIG. 3) by first inserting it in the slot 25 so that its forward and side edges are contiguous with the rear and side walls 26 and 28 of the slot, thereby closing the locating switches 34 and 34′. The record key 20 (FIG. 1) is then operated and maintained in an operated condition throughout the recording of the information on the data record 47.

The operated record key 20 closes normally open contacts $\mathbf{20}_A$, $\mathbf{20}_B$, and $\mathbf{20}_C$ (FIG. 6) and opens normally closed contacts $\mathbf{20}_D$. The closed contacts $\mathbf{20}_A$ in combination with the closed locating switches 34 and 34′ energize the motor 49, while the closed contacts $\mathbf{20}_B$ in combination with normally closed contacts $\mathbf{86}_A$ of a record relay 86 energize a logic relay 88. Finally, the closed contacts $\mathbf{20}_C$ energize the record relay 86, the energization of the record relay being delayed by a time constant introduced by a resistor 89 and a capacitor 90.

The energized logic relay 88 closes normally open contacts $\mathbf{88}_A$ and $\mathbf{88}_B$ thereof, and the closed contacts $\mathbf{88}_A$ energize the latch solenoid 54. As a result, the pawl 54 (FIG. 4) is withdrawn from the stepping cam 51, and the motor 49 is permitted to rotate the drive cam 42A and the printed circuit disc 53. The displacement of the printed circuit disc 53 closes the contacts $\mathbf{53}_A$, $\mathbf{53}_B$, $\mathbf{53}_C$, and $\mathbf{53}_D$ (FIG. 6) associated therewith, and the closed contacts $\mathbf{53}_A$ energize the pressure finger solenoids 45 to move the pressure fingers 44 (FIG. 3) downward and clamp the data record 47 in place.

The record relay 86 (FIG. 6) is energized shortly after the energization of the logic relay 88, and the energization of the record relay opens normally closed contacts 86 thereof and thereby deenergizes the logic relay 88. Contacts $\mathbf{88}_A$ subsequently reopen and deenergize the latch solenoid 54. The spring 54B (FIG. 4) moves the pawl 54A back into engagement with the stepping cam 51 and the rotation of the drive cam 42A and the printed circuit disc 53 are arrested.

The energization of the record relay 86 (FIG. 6) also closes normally open contacts $\mathbf{86}_B$ and $\mathbf{86}_H$ and transfers contacts $\mathbf{86}_C$ through $\mathbf{86}_G$. The closed normally open contacts $\mathbf{86}_C$ through $\mathbf{86}_G$ connect the record and reproduce heads 40A through 40D through the record-erase circuit, whereby positive potential is applied to the heads through resistors 91, 92, 93, and 94, while the open normally closed contacts $\mathbf{86}_C$ through $\mathbf{86}_G$ disconnect the heads from the read circuit.

Thereafter, the pushbuttons 18 (FIG. 5) are operated one at a time in the order that the digits are to be recorded. Each time a pushbutton 18 is operated, a unique pair of L′ and H′ (FIG. 6) contacts are closed. In addition, each operation of a pushbutton 18 opens normally closed contacts $\mathbf{80}_A$ and close normally open contacts $\mathbf{80}_B$, and the logic relay 88 is energized through a path comprising closed contacts $\mathbf{53}_B$, closed contacts $\mathbf{80}_B$, and a capacitor 95.

As before, the energization of the logic relay 88 closes contacts $\mathbf{88}_A$ thereof and energizes the latch solenoid 54 to retract the pawl 54A (FIG. 4) from the stepping cam 51. The stepping cam 51 is permitted to rotate and this rotation is transmitted through the reduction gear 52 to the drive cam 42A, the drive cam displacing the carriage 42 (FIG. 3) and thereby the record and reproduce heads 40A through 40D along the length of the magnetic strip 48.

Shortly after the stepping cam 51 (FIG. 4) begins to rotate, the lobe thereon closes the normally open contacts $\mathbf{51}_A$ and $\mathbf{51}_B$ for a measured period of time. The closed contacts $\mathbf{51}_B$ (FIG. 6) in combination with the closed contacts $\mathbf{86}_H$ apply negative current through the closed L′ and H′ contacts to the heads associated with the closed L′ and H′ contacts. This negative current flowing through the selected heads causes a reversal in magnetization in particular portions of the magnetic strip 48 as the heads move therealong. At the end of the measured period of time, the contacts $\mathbf{51}_A$ and $\mathbf{51}_B$ reopen and positive potential is again applied to the magnetic strip 48. Since both the positive and negative current is high enough to saturate the magnetic strip, erasure of a previous record is accomplished automatically.

The logic relay 88 remains energized only until capacitor 95 becomes fully charged, which is a period of time shorter than one revolution of the stepping cam 51. As a result, the latch solenoid 54 is deenergized and the pawl 54A (FIG. 4) returned by the spring 54B to its normal position against the stepping cam 51 in time to prevent the cam from making more than one revolution. Then when the operated pushbutton 18 is released, the contacts $\mathbf{80}_A$ (FIG. 6) reclose to discharge the capacitor 95 through a resistor 96.

The foregoing sequence is repeated until the recording of information on the magnetic strip 48 is completed. Upon such completion, the record key 20 is released reopening contacts $\mathbf{20}_A$, $\mathbf{20}_B$, and $\mathbf{20}_C$ and reclosing contacts $\mathbf{20}_D$. Closed contacts $\mathbf{20}_D$ in combination with closed normally open contacts $\mathbf{53}_B$ energize the logic relay 88, and close contacts $\mathbf{20}_D$ in combination with closed normally open contacts $\mathbf{53}_B$, closed normally open contacts $\mathbf{86}_B$, closed normally open contacts $\mathbf{53}_D$, and a diode 98 maintain the record relay 86 operated.

The energized logic relay 88 closes contacts $\mathbf{88}_B$ thereof to energize the motor 49 and closes contacts $\mathbf{88}_A$ thereof whereby, in the same manner as described above, the drive cam 42A is rotated moving the heads 40A through 40D along the magnetic strip 48. The energized record relay 86 applies positive potential to the heads 40A through 40D and therefore any previously recorded information beyond that presently recorded is erased.

At the completion of the scanning of the magnetic strip 48 and commencement of the return of the carriage 42 to the index position, the contacts $53_D$ reopen and the record relay 86 is deenergized to prevent erasure of the information just recorded. Then just before the drive cam 42A returns the carriage 42 to the index position, the contacts $53_A$ and $53_B$ open. The open contacts $53_A$ deenergize the pressure finger solenoids 45, and the pressure fingers 44 (FIG. 3) move up to release the data record 47. The open contacts $53_B$ (FIG. 6) deenergize the logic relay 88 and thereby the latch solenoid 54 and the motor 49. The data record 47 (FIG. 3) may now be removed from the slot 25 or it may be employed to transmit the information recorded thereon.

The data record 47 is employed to transmit information by inserting it into the slot 25 so that its forward and side edges are contiguous with the rear and side walls 26 and 28 of the slot to close the locating switches 34 and 34'. The call key 22 (FIG. 1) is then briefly operated to close normally open contacts $22_A$ and $22_B$ (FIG. 6). The closed contacts $22_A$ energize the motor 49 to bring it up to speed, while the closed contacts $22_B$ energize the logic relay 88. The energized logic relay 88 closes normally open contacts $88_A$ to energize the latch solenoid 54 and closes normally open contacts $88_B$ to provide an alternate energizing path for motor 49.

The latch solenoid 54 wtihdraws the pawl 54A (FIG. 4) from the stepping cam 51, and the driving cam 42A and printed circuit disc 53 commence to rotate. The rotation of the printed circuit disc 53 immediately closes contacts $53_A$ through $53_D$ thereof and the closed contacts $53_A$ (FIG. 6) energize the pressure finger solenoids 45, moving the pressure fingers 44 (FIG. 3) downward to clamp the data record in position. The closed contacts $53_B$ (FIG. 6) in combination with normally closed contacts $20_D$ provide an alternate energizing path for the logic relay 88, and the call key 22 may then be released.

The rotation of the drive cam 42A (FIG. 4) moves the record and reproduce heads 40A through 40D (FIG. 3) along the length of the magnetic strip 48. Each time any of the heads encounters a magnetization reversal, a signal is induced in the winding of that head and is transmitted through the appropriate normally closed contacts $86_C$ through $86_G$ (FIG. 6) and amplifiers 100A through 100D to the corresponding tap selecting relays 81 through 84. Selected ones of the tap selecting relays 81 through 84 are thereby energized, closing the contacts associated therewith in the frequency determining circuit 59 (FIG. 5) of the multifrequency signal generator 24.

In addition, with each revolution of the stepping cam 51 (FIG. 4), the lobe thereon closes the normally open contacts $51_A$ and $51_B$ for a measured period of time. The closed contacts $51_A$ (FIG. 6) in combination with the closed contacts $53_C$ provide an alternate energizing path for the tap selecting relays 81 through 84 through their own contacts so that when any one of the relays is energized by a signal from the head associated therewith, it is maintained energized for a period of time determined by the lobe on the stepping cam 51.

At the completion of the scanning of the magnetic strip 48 and the commencement of the return of the carriage 42 to the index position, the contacts $53_C$ reopen to prevent sustained energization of any of the tap selecting relays 81 through 84. Furthermore, just before the carriage 42 returns to the index position, the contacts $53_A$ and $53_B$ reopen to respectively deenergize the pressure finger solenoids 45 and the logic relay 88. The motor 49 and latch solenoid 54 are thereby deenergized, the carriage is returned to the index position, and the calling cycle is completed.

While in the embodiment herein described the encoding of the data record is magnetic, the invention is not so limited. It may also be incorporated in a call transmitter that senses marks on the data record optically, senses marks printed on the data record with conductive ink, or senses physical deformations in the data record. These various embodiments may be effected by persons skilled in the art without departing from the spirit and scope of the invention.

What is claimed is:

1. A call transmitter adapted to operate in conjunction with a rectangular data record having information encoded along one edge thereof, the data transmitter comprising:

a housing having a slot adapted to receive the edge of the data record along which the coding is located, the slot extending on two adjacent sides of the housing;

means for detecting the proper positioning of the data record within the slot, the detecting means being placed in a particular condition by the proper positioning of the data record;

means for holding the data record stationary in the proper position until scanning of all encoded information on the card is completed;

means enabled by the detecting means being placed in the particular condition for scanning the coding on the stationary data record, the scanning means moving relative to the stationary data record; and means responsive to the scanning means for transmitting signals corresponding to the information encoded on the record.

2. A call transmitter as in claim 1 wherein the holding means is enabled by the detecting means being placed in the particular condition.

References Cited

UNITED STATES PATENTS

| | | | |
|---|---|---|---|
| 3,175,048 | 3/1965 | Auel | 179—90 |
| 3,320,369 | 5/1967 | Hershey et al. | 179—90 |
| 3,124,659 | 3/1964 | Andregc et al. | 179—90 |
| 3,194,893 | 7/1965 | Auel | 179—90 |

FOREIGN PATENTS 1,115,308 10/1961 Germany.

KATHLEEN H. CLAFFY, Primary Examiner

J. S. BLACK, Assistant Examiner